US012770990B2

(12) United States Patent
Fukae

(10) Patent No.: US 12,770,990 B2
(45) Date of Patent: Oct. 20, 2026

(54) BATTERY

(71) Applicant: Prime Planet Energy & Solutions, Inc., Tokyo (JP)

(72) Inventor: Toshihide Fukae, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 439 days.

(21) Appl. No.: 18/488,621

(22) Filed: Oct. 17, 2023

(65) Prior Publication Data

US 2024/0128607 A1 Apr. 18, 2024

(30) Foreign Application Priority Data

Oct. 18, 2022 (JP) ................................ 2022-166908

(51) Int. Cl.
*H01M 50/00* (2021.01)
*H01M 10/04* (2006.01)
(Continued)

(52) U.S. Cl.
CPC ..... *H01M 50/538* (2021.01); *H01M 10/0431* (2013.01); *H01M 50/103* (2021.01)

(58) Field of Classification Search
CPC ............. H01M 50/538; H01M 50/103; H01M 10/0431; H01M 50/54
See application file for complete search history.

(56) References Cited

U.S. PATENT DOCUMENTS 6,159,253 A * 12/2000 Lund .................. H01M 50/466 429/136
2016/0218343 A1 7/2016 Kim et al.
(Continued)

FOREIGN PATENT DOCUMENTS

CN 206379432 U 8/2017
CN 108461829 A 8/2018
(Continued)

OTHER PUBLICATIONS

Sun, CN113437444A Machine Translation (Year: 2021).*

*Primary Examiner* — Anshu Bhatia
(74) *Attorney, Agent, or Firm* — Finnegan, Henderson, Farabow, Garrett and Dunner, LLP

(57) ABSTRACT

Regarding a herein disclosed battery 100, plural positive electrode tabs **22*t* are provided on a positive electrode 22. On a cross section view being cut in a direction orthogonal to a wound axis WL of a wound electrode assembly 20, the positive electrode 22 includes a first area A1 positioned at one side more than a wound axis WL of a wound electrode assembly 20 with respect to a thickness direction X reaching from the one flat surface $20f_1$ through the wound axis WL to the other flat surface $20f_2$ and includes a second area A2 positioned at the other side more than the wound axis WL with respect to the thickness direction X. In the first area A1, the positive electrode tabs 22*t* are provided on layers of eighty percent or more of the positive electrode 22. In the second area A2, among the layers counted until 5th layer from the wound axis WL side, there are plural layers on which the positive electrode tabs 22*t* are formed. On layers at outer side more than 5th layer counted from the wound axis WL side, none of the positive electrode tabs 22*t* are provided. And, plural positive electrode tabs 22*t* are laminated and then joined to a positive electrode collecting part 50**.

12 Claims, 9 Drawing Sheets

(51) Int. Cl.
*H01M 50/103* (2021.01)
*H01M 50/538* (2021.01)

(56) References Cited

U.S. PATENT DOCUMENTS

| | | | | |
|---|---|---|---|---|
| 2022/0200107 | A1* | 6/2022 | Tsukamoto ....... | H01M 10/0587 |
| 2023/0121494 | A1 | 4/2023 | Tang et al. | |
| 2023/0170519 | A1 | 6/2023 | Yanase et al. | |
| 2023/0170585 | A1 | 6/2023 | Yanase et al. | |
| 2023/0238667 | A1 | 7/2023 | Sun et al. | |

FOREIGN PATENT DOCUMENTS

| | | | | | |
|---|---|---|---|---|---|
| CN | 113097570 | A | | 7/2021 | |
| CN | 113437444 | A | * | 9/2021 | .......... H01M 50/538 |
| CN | 113728457 | A | | 11/2021 | |
| CN | 216120651 | U | | 3/2022 | |
| JP | 2013-187077 | A | | 9/2013 | |
| JP | 6641116 | B | | 2/2020 | |
| JP | 2023-078785 | A | | 6/2023 | |
| JP | 2023-078786 | A | | 6/2023 | |
| KR | 10-2018-0097243 | A | | 8/2018 | |
| WO | WO 2020/218473 | A1 | | 10/2020 | |

* cited by examiner

BATTERY

CROSS REFERENCE TO RELATED APPLICATIONS

The present application claims the benefit of priority to Japanese Patent Application No. 2022-166908 filed on Oct. 18, 2022. The entire contents of this application are hereby incorporated herein by reference.

BACKGROUND OF THE DISCLOSURE

1. Technical Field

The present disclosure relates to a battery.

2. Description of Background

For example, a publication of Japanese Patent No. 6641116 discloses an electrode assembly having a separator between a positive electrode and a negative electrode and then being wound. Then, the positive electrode includes plural positive electrode tabs, and the negative electrode includes plural negative electrode tabs.

SUMMARY

Anyway, based on an examination of the present inventor, it has been understood that still there is a room from a perspective of enhancing a reliability of a battery for improving the battery including the wound electrode assembly as described above.

A herein disclosed battery is a battery including a wound electrode assembly formed in a flat shape in which a first electrode formed in a strip-like shape and a second electrode formed in a strip-like shape are wound via a separator formed in a strip-like shape. The first electrode is provided with plural first electrode tabs. On a cross section view being cut in a direction orthogonal to a wound axis of the wound electrode assembly, the first electrode includes a first area positioned at one side more than the wound axis of the wound electrode assembly with respect to a thickness direction reaching from one flat surface through the wound axis to the other flat surface, and includes a second area positioned at the other side more than the wound axis with respect to the thickness direction. In the first area, the first electrode tabs are provided on layers of eighty percent or more of the first electrode. In the second area, among the layers counted until 5th layer from the wound axis side, there are plural layers on which the first electrode tabs are formed. On the layers positioned at an outer side more than the 5th layer counted from the wound axis side, none of the first electrode tabs are provided. And, plural first electrode tabs are laminated and then joined to an electrically collecting member. According to the battery including the above described configuration, a reliability of the battery is suitably enhanced, and thus it is preferable.

DERAILED DESCRIPTION

Below, while referring to drawings, some of preferred embodiments for a herein disclosed technique will be explained. Incidentally, the matters other than matters particularly mentioned in this specification, and required for practicing the present disclosure (for example, a general configuration and manufacturing process for the battery by which the present disclosure is not characterized) can be grasped as design matters of those skilled in the art based on the conventional technique in the present field. The present disclosure can be executed based on the contents disclosed in the present specification, and the technical common sense in the present field. In addition, it is not intended, of course, that embodiments explained here particularly restricts the present disclosure. In addition, a wording “A to B” representing a range in the present specification semantically covers not only a meaning equal to or more than A and not more than B, but also meanings “more than A” and “less than B”.

Incidentally, in the present specification, the “battery” is a term widely denoting an electric storage device from which an electric energy can be taken out, and is a concept containing the primary battery and the secondary battery. In addition, in the present specification, the “secondary battery” represents a general electric storage device that can be repeatedly charged and discharged by making charge carriers move between a positive electrode and a negative electrode via an electrolyte. The electrolyte might be a liquid-type electrolyte (electrolytic solution), gel-type electrolyte, or a solid-type electrolyte. The secondary battery described above semantically covers not only a so-called storage battery (chemical battery), such as lithium ion secondary battery and nickel hydrogen battery, but also a capacitor (physical battery), such as electric double layer capacitor, or the like. Below, embodiments will be described in a case where the lithium ion secondary battery is treated as a target.

<Configuration of Battery>

Figure 1:
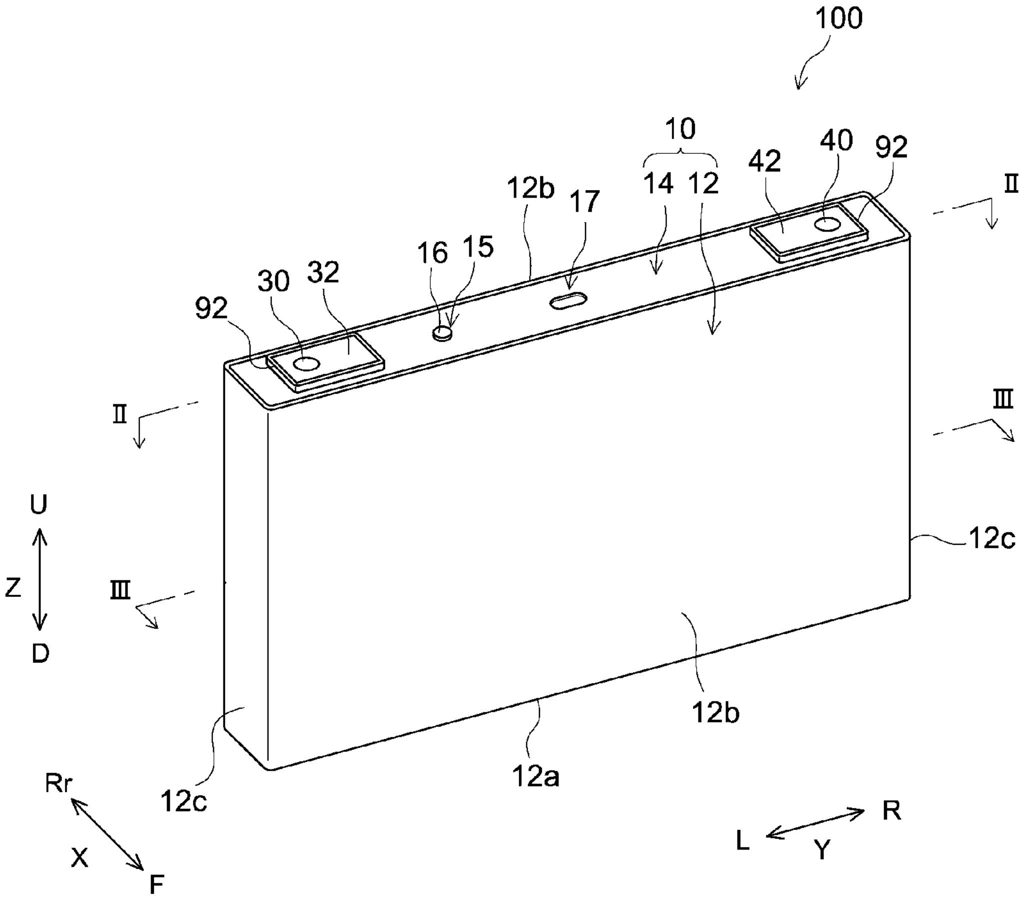
FIG. 1 is a perspective view that schematically shows a battery in accordance with one embodiment.
Figure 2:
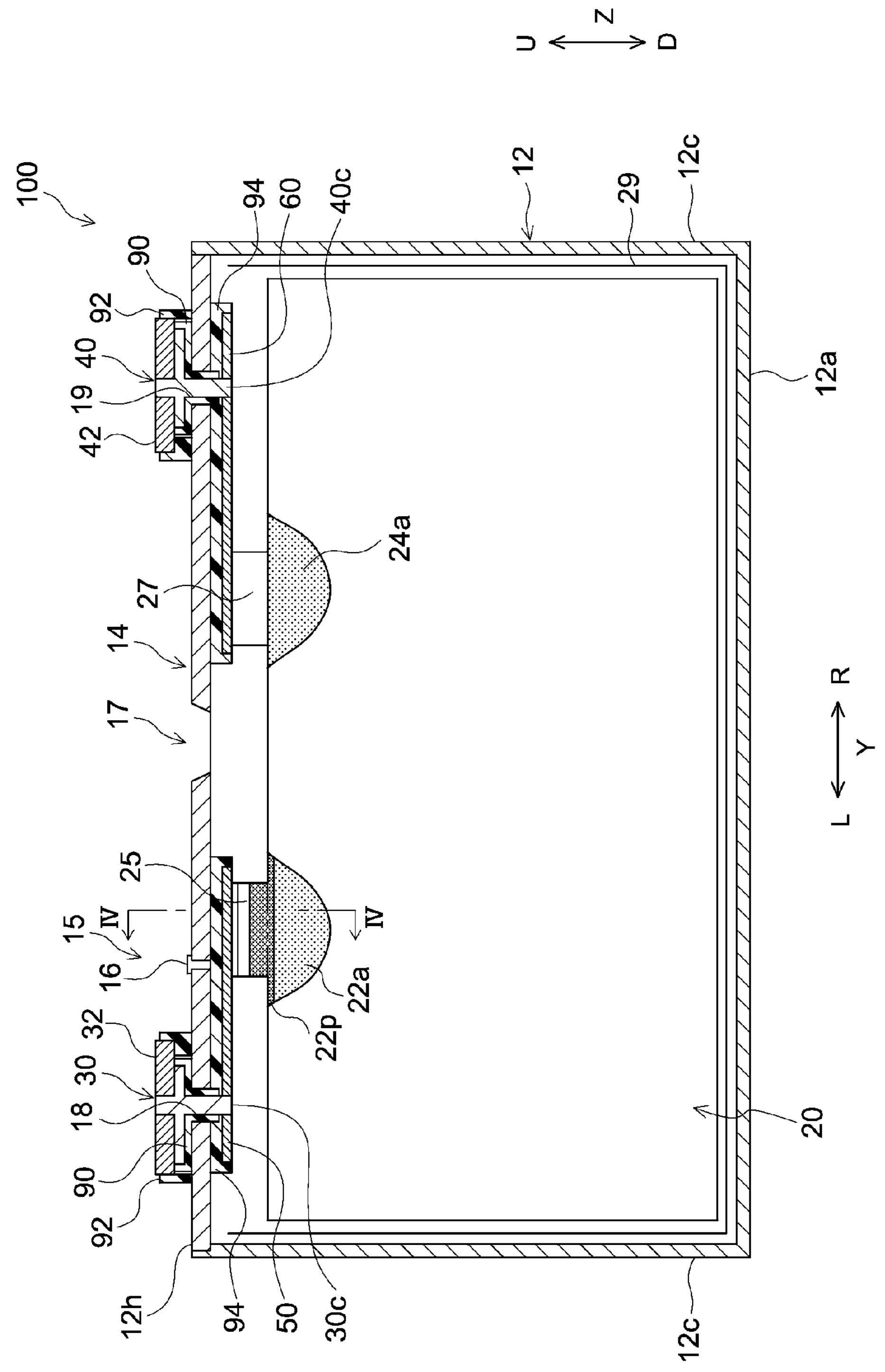
FIG. 2 is a longitudinal cross section view that is schematically shown along a II-II line of FIG. 1.
Figure 3:
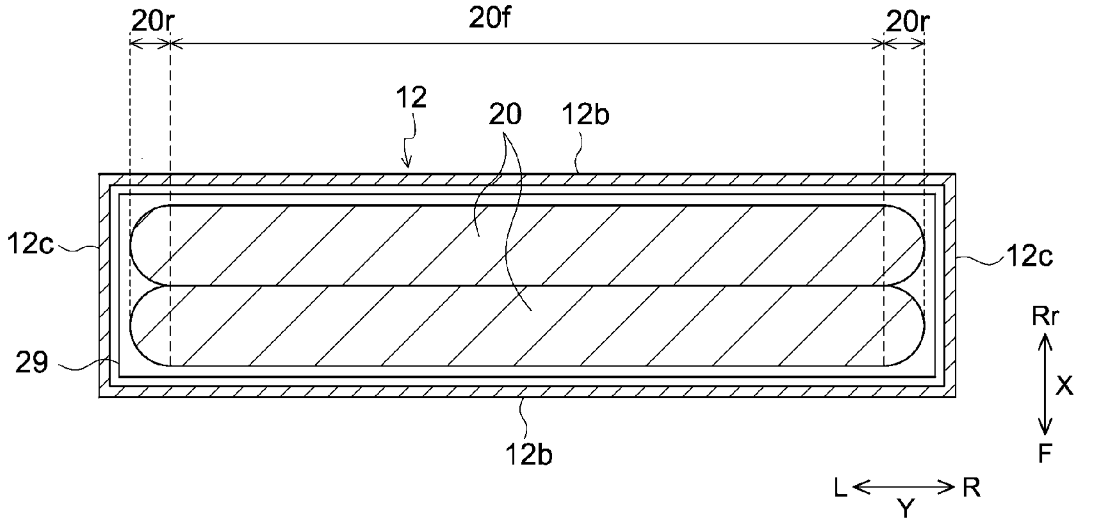
FIG. 3 is a lateral cross section view that is schematically shown along a III-III line of FIG. 1.
Figure 4:
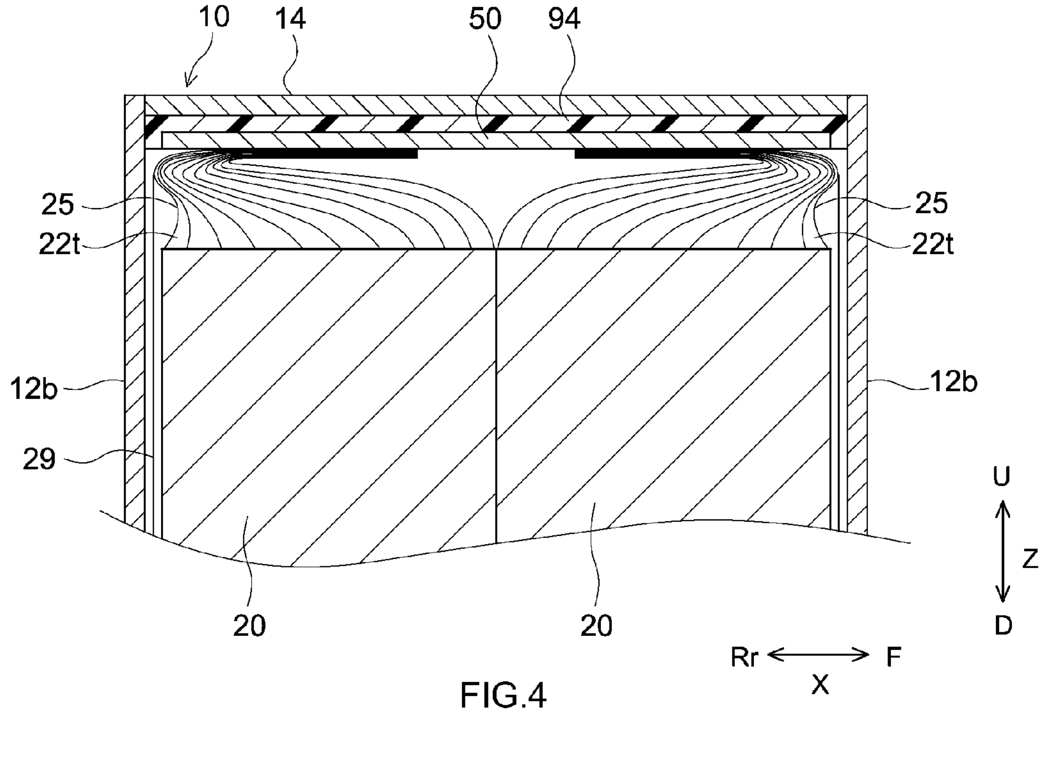
FIG. 4 is a longitudinal cross section view that is schematically shown along a IV-IV line of FIG. 2.
Figure 8:
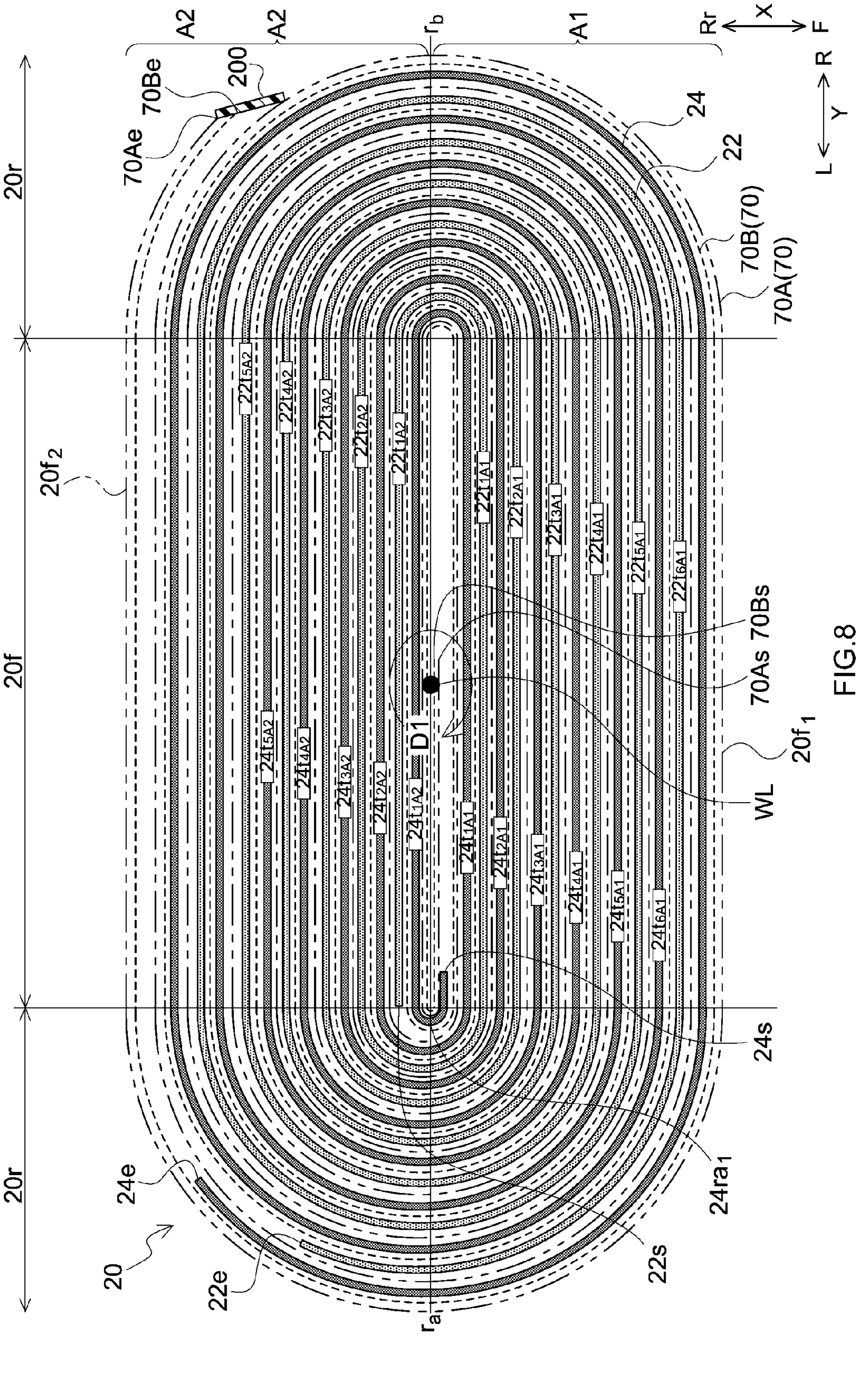
FIG. 8 is a schematic view that shows a configuration of a cross section of the wound electrode assembly of FIG. 3.

FIG. 1 is a perspective view that schematically shows a battery 100 in accordance with the present embodiment. It is preferable that the battery 100 is a secondary battery, and it is further preferable that the battery is, for example, a nonaqueous electrolyte secondary battery, such as lithium ion secondary battery. FIG. 2 is a longitudinal cross section view that is schematically shown along a II-II line of FIG. 1. FIG. 3 is a lateral cross section view that is schematically shown along a III-III line of FIG. 1. FIG. 4 is a longitudinal cross section view that is schematically shown along a IV-IV line of FIG. 2. Incidentally, in explanation described below, reference signs L, R, F, Rr, U, and D in figures respectively represent left, right, front, rear, up, and down. In addition, a reference sign X in the figures represents a short side direction of the battery 100, a reference sign Y represents a long side direction of the battery 100, and a reference sign Z represents a vertical direction of the battery 100. However, these are merely directions for convenience sake of explanation, which never restrict the disposed form of the battery 100. In addition, a wound direction D1 in FIG. 8 is merely a direction for convenience sake, and is not intended to restrict the wound direction to that direction.

Incidentally, in the present embodiment, a first electrode is configured to be the positive electrode 22 (in other words, a first electrode tab is configured to be a positive electrode tab 22*t*), and a second electrode is configured to be the negative electrode 24 (in other words, a second electrode tab is configured to be a negative electrode tab 24*t*), but it is not intended that a herein disclosed technique is restricted to this embodiment. In another embodiment, it is possible to make the first electrode be configured to be the negative electrode 24 (in other words, the first electrode tab is configured to be the negative electrode tab 24*t*), and make the second electrode be configured to be the positive electrode 22 (in other words, the second electrode tab is configured to be the positive electrode tab 22*t*). On the other hand, a material of a positive electrode collecting body 22*c* configuring the positive electrode 22 is generally soft and easily broken, and thus, in a case where the first electrode is configured to be the positive electrode 22, it can be easy to obtain the effect of the herein disclosed technique, and thus it is preferable. In addition, it is sufficient for the herein disclosed technique that the herein disclosed technique is applied at least to the first electrode, but, for example, as in a case of the present embodiment where the herein disclosed technique is applied not only to the first electrode (here, positive electrode 22) but also to the second electrode (here, negative electrode 24), it is possible to further effectively obtain the effect of the herein disclosed technique, and thus it is preferable.

As shown in FIG. 1 to FIG. 3, the battery 100 includes a battery case 10 (see FIG. 1), plural wound electrode assemblies 20 (see FIG. 2, and FIG. 3), a positive electrode terminal 30 (see FIG. 1, and FIG. 2), a negative electrode terminal 40 (see FIG. 1, and FIG. 2), a positive electrode collecting part 50 (see FIG. 2), and a negative electrode collecting part 60 (see FIG. 2). As the illustration is omitted, the battery 100 herein further includes an electrolytic solution. The battery 100 is a nonaqueous electrolytic solution secondary battery. Below, a particular configuration of the battery 100 will be described.

The battery case 10 is a housing configured to accommodate the wound electrode assembly 20. As shown in FIG. 1, the battery case 10 herein has an outer appearance that is formed in a flat and bottomed rectangular parallelopiped shape (square shape). However, in another embodiment, the outer appearance of the battery case 10 might be a different shape, such as cylindrical shape. In addition, it is possible as the housing to use a laminate type case. As shown in FIG. 2, the battery case 10 includes an outer package 12 having an opening 12*h* and includes a sealing plate (lid body) 14 configured to seal the opening 12*h*. A material of the battery case 10 (outer package 12 and sealing plate 14) might be the same as a material conventionally used, and is not particularly restricted. It is preferable that the battery case 10 is made of metal, and it is further preferable that, for example, the battery case is made of aluminum, aluminum alloy, iron, iron alloy, or the like. The outer package 12 and the sealing plate 14, which configure the battery case 10, might be made from the same material or might be respectively made from different materials. Each of the outer package 12 and the sealing plate 14 has a volume based on an accommodated number of the wound electrode assemblies 20 (single or plural; here, plural), a size, or the like.

The outer package 12 is, as shown in FIG. 1 and FIG. 2, a container that has the opening 12*h* at the upper surface and that is formed in a bottomed square shape. The outer package 12 includes, as shown in FIG. 1, a bottom wall 12*a*, a pair of longer side walls 12*b* extending upward from long sides of the bottom wall 12*a* and being opposed mutually, and a pair of shorter side walls 12*c* extending upward from short sides of the bottom wall 12*a* and being opposed mutually. The longer side wall 12*b* and the shorter side wall 12*c* are respectively an example of a first side wall disclosed herein and an example of a second side wall disclosed herein. An area size of the longer side wall 12*b* is larger than an area size of the shorter side wall 12*c*. The bottom wall 12*a* is formed in an approximately rectangular shape. The bottom wall 12*a* is opposed to the opening 12*h* (see FIG. 2). The longer side wall 12*b* and the shorter side wall 12*c* are examples of "side wall". The sealing plate 14 is a plate-shaped member formed in a flat surface approximately rectangular shape, which is attached to the outer package 12 so as to cover the opening 12*h* of the outer package 12. The sealing plate 14 is opposed to the bottom wall 12*a* of the outer package 12. The sealing plate 14 is formed in an approximately rectangular shape. The battery case 10 is integrated by making the sealing plate 14 be joined (for example, welded and joined) to a peripheral edge of the opening 12*h* of the outer package 12. By doing this, the battery case 10 is airtightly sealed (hermetically sealed).

As shown in FIG. 2, the sealing plate 14 is provided with a liquid injection hole 15, a gas exhaust valve 17, and terminal taking out holes 18, 19. The liquid injection hole 15 is a penetration hole that is configured for injecting the electrolytic solution to an inside of the battery case 10 after the sealing plate 14 is assembled to the outer package 12. The liquid injection hole 15 is sealed by a sealing member 16 after the liquid injection of the electrolytic solution. The gas exhaust valve 17 is a thin-walled part that is configured to be broken when a pressure inside the battery case 10 becomes equal to or more than a predetermined value and that is configured so as to exhaust the gas inside the battery case 10 to an outside.

As the electrolytic solution, one used for a conventionally known battery can be used without particular restriction. As one example, it is possible to use a nonaqueous electrolytic solution in which a supporting salt is dissolved into a nonaqueous type solvent. As one example of the nonaqueous type solvent, it is possible to use a carbonate type solvent, such as ethylene carbonate, dimethyl carbonate, and ethyl methyl carbonate. As one example of the supporting salt, it is possible to use a fluorine-containing lithium salt, such as $LiPF_6$. The electrolytic solution might contain an additive agent, as needed.

The positive electrode terminal 30 is attached to one of the end parts (left end part in FIG. 1 and FIG. 2) in a long side direction Y of the sealing plate 14. The negative electrode terminal 40 is attached to the other one of the end parts (right end part in FIG. 1 and FIG. 2) in the long side direction Y of the sealing plate 14. The positive electrode terminal 30 and the negative electrode terminal 40 are respectively inserted into the terminal taking out holes 18, 19 and are configured to be exposed to a surface at an outer side of the sealing plate 14. The positive electrode terminal 30 is electrically connected to a plate-shaped positive electrode outside conductive member 32 at an outer side of the battery case 10. The negative electrode terminal 40 is electrically connected to a plate-shaped negative electrode outside conductive member 42 at the outer side of the battery case 10. The positive electrode outside conductive member 32 and the negative electrode outside conductive member 42 are connected to another secondary battery or an outside equipment via an outside connecting member, such as bus bar. It is preferable that the positive electrode outside conductive member 32 and the negative electrode outside conductive member 42 are configured with metal outstanding for electrical conductivity, and are configured with, for example, aluminum, aluminum alloy, copper, copper alloy, or the like. However, the positive electrode outside conductive member 32 and the negative electrode outside conductive member 42 are not essential, and might be omitted in another embodiment.

As shown in FIG. 3 and FIG. 4, regarding the battery 100 of the present embodiment, plural (in particular, 2) wound electrode assemblies 20 are accommodated in the battery case 10. However, the number of the wound electrode assemblies arranged inside single outer package 12 is not particularly restricted, might be equal to or more than 3 (plural), or might be 1. Although a particular structure of the wound electrode assembly 20 will be described later, a positive electrode tab group 25 and a negative electrode tab group 27 protrude to an upper part of the wound electrode assembly 20 as shown in FIG. 2. The battery 100 has a so-called upward tab structure in which the positive electrode tab group 25 and the negative electrode tab group 27 are positioned above the wound electrode assembly 20.

As shown in FIG. 4, the positive electrode tab group 25 in a bent state is joined to the positive electrode collecting part (positive electrode collecting member) 50. In accordance with such a configuration, it is possible to further suitably enhance a volume energy density of the battery 100, and thus it is preferable. As the illustration is omitted, similarly, the negative electrode tab group 27 in a bent state is joined to the negative electrode collecting part (negative electrode collecting member) 60. In addition, it is preferable that the positive electrode tab group 25 is joined to an area on the positive electrode collecting part 50 where it is arranged along a wall part (preferably, sealing plate 14) of the battery case. Similarly, it is preferable that the negative electrode tab group 27 is joined to an area on the negative electrode collecting part 60 where it is arranged along the wall part (preferably, sealing plate 14) of the battery case.

The positive electrode collecting part 50 is configured to electrically connect the positive electrode tab group 25 of the wound electrode assemblies 20 and the positive electrode terminal 30. The positive electrode collecting part 50 is, as shown in FIG. 2, a plate-shaped conductive member that extends in the long side direction Y along an inner side surface of the sealing plate 14. One (right side in FIG. 2) of end parts of the positive electrode collecting part 50 is electrically connected to the positive electrode tab group 25. The other one (left side in FIG. 2) of the end parts of the positive electrode collecting part 50 is electrically connected to a lower end part 30*c* of the positive electrode terminal 30. It is preferable that the positive electrode terminal 30 and the positive electrode collecting part 50 are configured with metal outstanding for electrical conductivity, and might be configured with, for example, aluminum or aluminum alloy.

The negative electrode collecting part 60 is configured to electrically connect the negative electrode tab group 27 of the wound electrode assemblies 20 and the negative electrode terminal 40. The negative electrode collecting part 60 is, as shown in FIG. 2, a plate-shaped conductive member that extends in the long side direction Y along the inner side surface of the sealing plate 14. One (left side in FIG. 2) of end parts of the negative electrode collecting part 60 is electrically connected to the negative electrode tab group 27. The other one (right side in FIG. 2) of the end parts of the negative electrode collecting part 60 is electrically connected to a lower end part 40*c* of the negative electrode terminal 40. It is preferable that the negative electrode terminal 40 and the negative electrode collecting part 60 are configured with metal outstanding for electrical conductivity, and might be configured with, for example, copper or copper alloy.

Regarding the battery 100, in order to inhibit conduction between the wound electrode assembly 20 and the battery case 10, various insulating members are used. For example, as shown in FIG. 1, the positive electrode outside conductive member 32 and the negative electrode outside conductive member 42 are insulated by an outside insulating member 92 from the sealing plate 14. In addition, as shown in FIG. 2, a gasket 90 is attached to each of the terminal taking out holes 18, 19 of the sealing plate 14. By doing this, it is possible to inhibit the positive electrode terminal 30 and the negative electrode terminal 40, which are inserted into the terminal taking out holes 18, 19, from becoming conductive with the sealing plate 14. In addition, an inside insulating member 94 is arranged between the positive electrode collecting part 50 and negative electrode collecting part 60, and an inner surface side of the sealing plate 14. By doing this, it is possible to inhibit the positive electrode collecting part 50 and the negative electrode collecting part 60 from becoming conductive with the sealing plate 14. Incidentally, the inside insulating member 94 might include a protruding part that is configured to protrude toward the wound electrode assembly 20.

Furthermore, the plural wound electrode assemblies 20 are arranged inside the outer package 12 under a state of being covered with an electrode assembly holder 29 (see FIG. 3) that consists of a resin sheet having an insulating property. By doing this, it is possible to inhibit the wound electrode assembly 20 from directly coming into contact with the outer package 12. Incidentally, a material of each insulating member described above is not particularly restricted, if a predetermined insulating property is implemented. As one example of the above described material, it is possible to use a synthetic resin material that is a polyolefin resin, such as polypropylene (PP) and polyethylene (PE), a fluorine type resin, such as perfluoro alkoxy alkane and polytetrafluoroethylene (PTFE), or the like.

Figure 5:
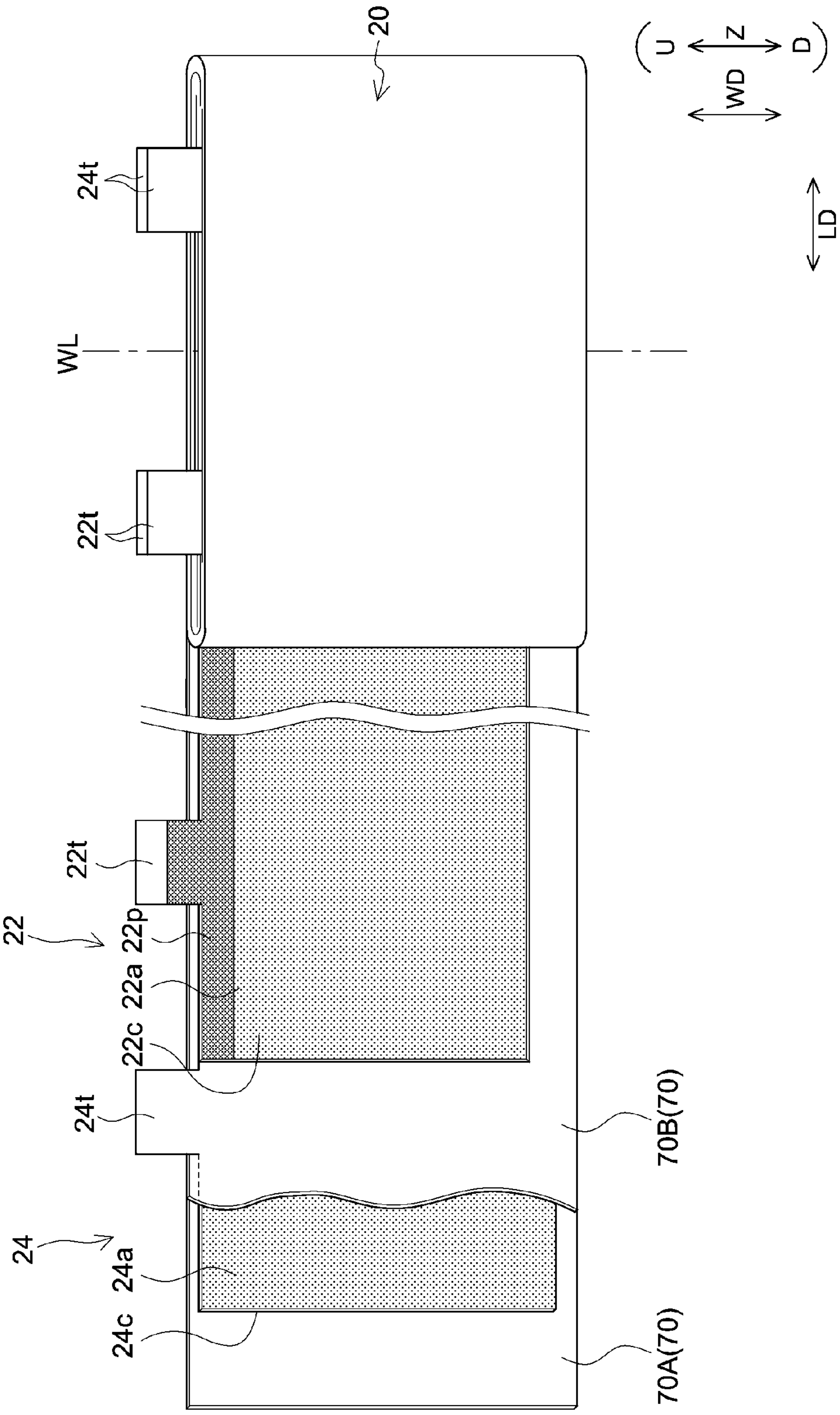
FIG. 5 is a schematic view that shows a configuration of a wound electrode assembly in accordance with one embodiment.

FIG. 5 is a schematic view that shows a configuration of the wound electrode assembly 20. As shown in FIG. 5, the wound electrode assembly 20 is configured by laminating a positive electrode 22 formed in a strip-like shape and a negative electrode 24 formed in a strip-like shape under a state where the positive electrode and the negative electrode are arranged via two separators 70 each formed in a strip-like shape (first separator 70A, and second separator 70B) so as to be insulated, and by winding the resultant in a longitudinal direction with a wound axis WL treated as a center. Incidentally, a reference sign LD in FIG. 5, or the like, represents a longitudinal direction (in other words, carrying direction) of the wound electrode assembly 20 and the separator 70, each of which is manufactured in a strip-like shape. A reference sign WD represents a wound axis direction (which might be referred to as width direction) of the wound electrode assembly 20 and the separator 70, which is a direction approximately orthogonal to the longitudinal direction LD. The wound axis direction WD is approximately parallel to a vertical direction Z of the above described battery 100.

An outer shape of the wound electrode assembly 20 herein is a flat shape. It is preferable that the wound electrode assembly 20 is formed in the flat shape. The wound electrode assembly 20 formed in the flat shape can be made, for example, by performing a press mold on an electrode assembly (cylindrical body) wound in a cylindrical shape so as to make the electrode assembly be flat. The wound electrode assembly 20 formed in the flat shape, as shown in FIG. 3, includes a pair of bent parts **20*r*, an outer surface of each bent part being bent, and includes a pair of flat parts 20*f* configured to couple the pair of bent parts 20*r***, an outer surface of each flat part being flat.

Figure 6:
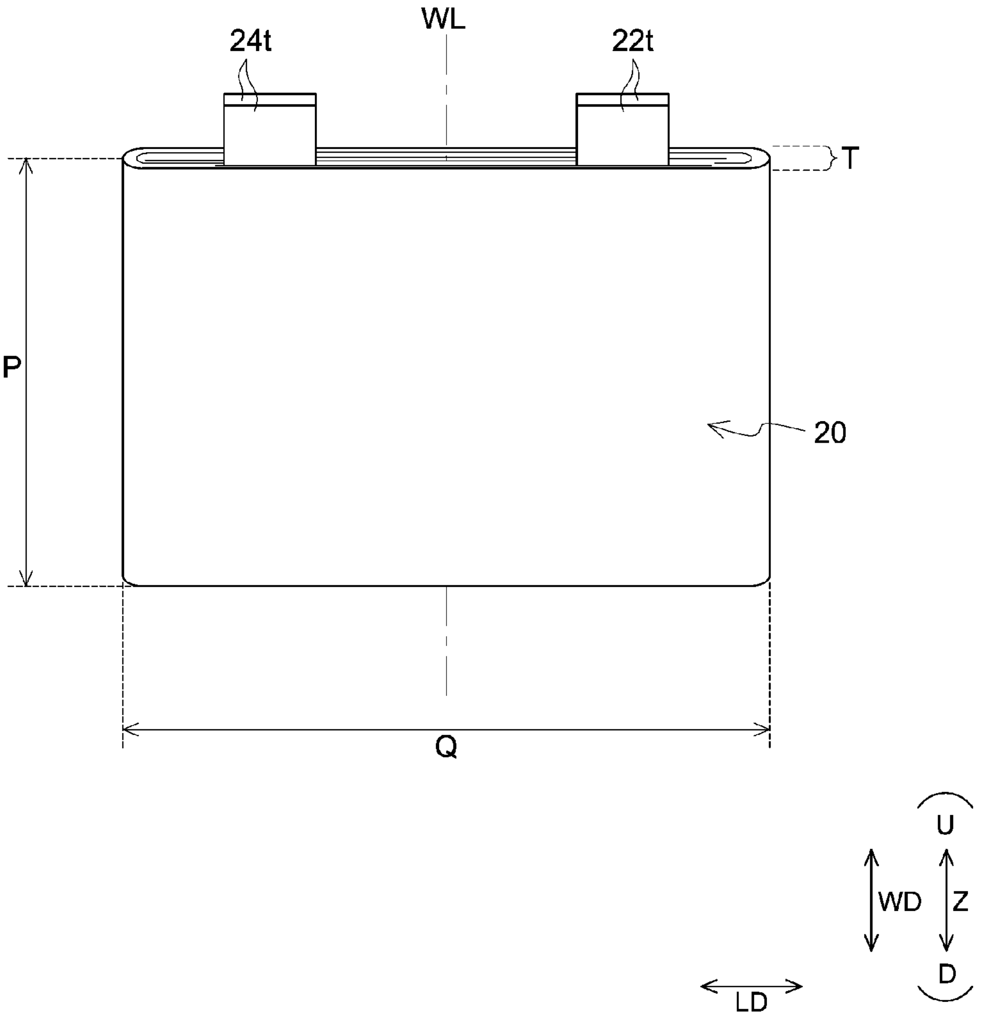
FIG. 6 is a schematic view that shows the wound electrode assembly in accordance with one embodiment.

FIG. 6 is a schematic view that shows the wound electrode assembly 20. A reference sign P in FIG. 6 represents a height of the wound electrode assembly 20 (in other words, a length in a direction along the wound axis WL of the wound electrode assembly 20, which might be referred to as a length in a direction connecting the bottom wall **12*a* of the outer package 12 and the sealing plate 14). In addition, a reference sign Q in FIG. 6 represents a width of the wound electrode assembly 20 (in other words, a length in a direction orthogonal to a thickness direction X of the wound electrode assembly 20, which might be referred to as a length in a direction connecting a pair of shorter side walls 12*c* of the outer package 12). Here, a ratio (Q/P) of the width Q of the wound electrode assembly 20 with respect to the height P of the wound electrode assembly 20, which is not particularly restricted if the effects of the technique herein disclosed are implemented, is, for example, equal to or more than 2, is preferably equal to or more than 3 from a perspective of improving impregnation of the electrolytic solution so as to further suitably enhance a high rate characteristic and a rapid charge characteristic, or might be, for example, equal to or more than 4. In addition, an upper limit of the ratio (Q/P), which is not particularly restricted, is, for example, equal to or less than 10, or might be equal to or less than 7, or equal to or less than 5. The height P of the wound electrode assembly 20 is preferably equal to or more than 50 mm, or might be, for example, equal to or more than 100 mm. In addition, the height P of the wound electrode assembly 20 is preferably equal to or less than 200 mm, or further preferably equal to or less than 150 mm. The width Q of the wound electrode assembly 20 is preferably equal to or more than 100 mm, or further preferably equal to or more than 200 mm. In addition, the width Q of the wound electrode assembly 20** might be, for example, equal to or less than 600 mm, might be equal to or less than 500 mm, or might be equal to or less than 400 mm. However, it is not intended that the present disclosure is restricted to these examples.

A reference sign T in FIG. 6 represents a thickness of the wound electrode assembly 20. The thickness T of the wound electrode assembly 20 is, which is not particularly restricted if the effects of the herein disclosed technique is implemented, for example, equal to or more than 10 mm, preferably equal to or more than 12 mm from a perspective of further suitably enhancing a volume energy of the battery 100, further preferably equal to or more than 15 mm, or furthermore preferably equal to or more than 20 mm. An upper limit of the thickness T of the wound electrode assembly 20, which is not particularly restricted, might be, for example, equal to or less than 50 mm, might be equal to or less than 40 mm, or might be equal to or less than 30 mm. However, it is not intended that the present disclosure is restricted to these examples.

In the battery 100, the wound electrode assembly 20 is accommodated inside the battery case 10 to make the wound axis direction WD approximately coincide with the vertical direction Z. In other words, the wound electrode assembly 20 is arranged inside the battery case 10, with the wound axis direction WD arranged to be approximately parallel to the longer side wall **12*b* and the shorter side wall 12*c* and arranged to be in a direction approximately orthogonal to the bottom wall 12*a* and the sealing plate 14. In other words, the wound electrode assembly 20 is arranged inside the battery case 10 with its own wound axis WL arranged to be in a direction perpendicular to the bottom wall 12*a*. As described above, the configuration of the wound electrode assembly 20 whose upper portion and lower portion are opened can implement improving impregnation of the electrolytic solution and further suitably enhancing the high rate characteristic and the rapid charge characteristic, and thus it is preferable. In addition, the configuration can make the battery 100 become a high capacity battery, and thus it is preferable. As shown in FIG. 3, the pair of bent parts 20*r* are arranged to be opposed to the pair of shorter side walls 12*c* of the outer package 12. The pair of flat parts 20*f* are arranged to be opposed to longer side walls 12*b* of the outer package 12. End surfaces (in other words, laminate surfaces in which the positive electrode 22 and the negative electrode 24 are laminated, or opposite ends in the wound axis direction WD of FIG. 5) of the wound electrode assembly 20 are opposed to the bottom wall 12*a* and the sealing plate 14**.

The positive electrode 22 is, as shown in FIG. 5, a member formed in a strip-like shape. The positive electrode 22 includes a positive electrode collecting body **22*c* formed in a strip-like shape, and a positive electrode active material layer 22*a* and positive electrode protective layer 22*p* fixed on at least one surface of the positive electrode collecting body 22*c*. It is preferable from a perspective of battery performance that the positive electrode active material layer 22*a* is formed on both surfaces of the positive electrode collecting body 22*c***.

As each of members configuring the positive electrode 22, it is possible to use a conventionally known material which can be used for a general battery (for example, lithium ion secondary battery), without particular restriction. For example, it is preferable that the positive electrode collecting body **22*c* is made from an electrically conductive metal, such as aluminum, aluminum alloy, nickel, and stainless steel, and the positive electrode collecting body herein is a metal foil, in particular, an aluminum foil. A thickness of the positive electrode collecting body 22*c*** is preferably 5 μm to 30 μm, or further preferably 8 μm to 25 μm.

The positive electrode 22 includes, as shown in FIG. 5, plural positive electrode tabs **22*t* that protrude toward an outer side (upper side in FIG. 5) from one end side in the wound axis direction WD. The plural positive electrode tabs 22*t* are provided to be spaced away from each other by a predetermined interval (intermittently) along the longitudinal direction LD. The positive electrode tab 22*t* herein is a part of the positive electrode 22. The positive electrode tab 22*t* is an area where the positive electrode active material layer 22*a* is not formed. On a part of the positive electrode tab 22$t$ herein, the positive electrode protective layer 22$p$ is provided. However, the positive electrode tab 22$t$ might not be provided with the positive electrode protective layer 22$p$. On at least a part of the positive electrode tab 22$t$, the positive electrode collecting body 22$c$ is exposed. The positive electrode tab 22$t$ might be a member different from the positive electrode 22**.

The plural positive electrode tabs 22$t$ each is herein formed in a trapezoidal shape. However, a shape of the positive electrode tab 22$t$ is not restricted to this shape. In addition, sizes of the plural positive electrode tabs 22$t$ are not particularly restricted. The shape or size of the positive electrode tab 22$t$ can be suitably adjusted, for example, in consideration of a state of being connected to the positive electrode collecting part 50, and based on a formed position, or the like. In one aspect, a length in a width direction (LD direction in FIG. 5) of the positive electrode tab 22$t$ might be 10 mm to 30 mm (for example, 15 mm to 20 mm), a length in a protruding direction (Z direction in FIG. 5) of the positive electrode tab 22$t$ might be 10 mm to 30 mm (for example, 15 mm to 20 mm). The plural positive electrode tabs 22$t$ are laminated at one of the end parts (top end part in FIG. 5) in the wound axis direction WD of the positive electrode 22, so as to configure the positive electrode tab group 25 (see FIG. 2). Here, FIG. 11 is a longitudinal cross section view that is schematically shown along a XI-XI line in FIG. 10. As shown in FIG. 11, here, the length in the protruding direction (direction Z in FIG. 11) of the positive electrode tab 22$t$ is configured to become gradually larger. Although not shown in figures, a configuration at the negative electrode side is also similarly formed.

Figure 7:
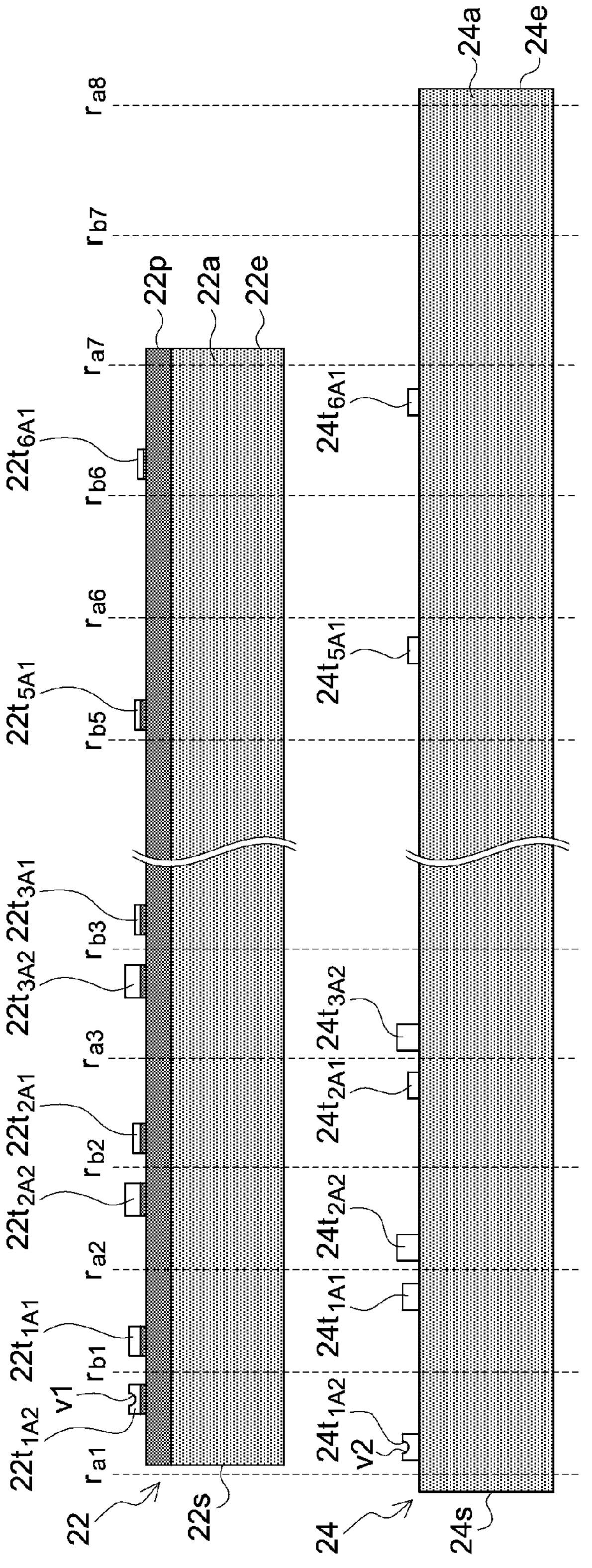
FIG. 7 is a schematic view that shows configurations of a positive electrode and a negative electrode in accordance with one embodiment.

FIG. 7 is a schematic view that shows configurations of the positive electrode 22 and the negative electrode 24. Here, in FIG. 7 and FIG. 8, a reference sign $r_a$ ($r_{a1}$, $r_{a2}$, $r_{a3}$, . . . $r_{a6}$, $r_{a7}$, and $r_{a8}$) and a reference sign $r_b$ ($r_{b1}$, $r_{b2}$, $r_{b3}$, . . . $r_{b5}$, $r_{b6}$, and $r_{b7}$) represent apexes of the bent part 20$r$. As shown in FIG. 7, a notch v1 is formed on a first tab of the positive electrode 22 (here, corresponding to a positive electrode tab 22$t_{1A2}$, which is also referred to as the positive electrode tab 22$t$ existing at a position closest from the wound axis WL side in the thickness direction X on the second area A2). In addition, a notch v2 is formed on a first tab of the negative electrode 24 (here, corresponding to a negative electrode tab 24$t_{1A2}$, which is also referred to as the negative electrode tab 24$t$ existing at a position closest from the wound axis WL side in the thickness direction X on the second area A2). In accordance with such a configuration, it can be facilitated to detect winding starts of the positive electrode 22 and the negative electrode 24 when the positive electrode 22 and the negative electrode 24 are wound on a later described wound roller, and thus it is preferable. As shown in FIG. 7, each shape of the notches v1 and v2 herein is formed to be a semicircular shape. In addition, each size of the notches v1 and v2 herein is configured to be about φ3 mm. However, the shape of the notch is not restricted to this example, and it is possible to form it in other various shapes, such as rectangular shape, and inverted triangle shape. Then, it is preferable that the size of the notch is suitably adjusted on the basis of a size of the tab, or the like.

The positive electrode active material layer 22$a$ is, as shown in FIG. 5, provided in a strip-like shape along the longitudinal direction LD of the positive electrode collecting body 22$c$. A width of the positive electrode active material layer 22$a$ (length in the wound axis direction WD, and this meaning is similarly used, below) is smaller than a width of the negative electrode active material layer 24$a$. The positive electrode active material layer 22$a$ contains a positive electrode active material that can reversibly store and release a charge carrier. The positive electrode active material is preferably a lithium transition metal composite oxide, or further preferably one containing at least Ni (nickel) or Co (cobalt) even among the lithium transition metal composite oxides. As one example of the lithium transition metal composite oxide described above, it is possible to use a lithium-nickel-cobalt-manganese composite oxide. When a total solid content of the positive electrode active material layer 22$a$ is treated as 100 mass %, the positive electrode active material might occupy approximately 80 mass % or more, typically 90 mass % or more, or, for example, 95 mass % or more. The positive electrode active material layer 22$a$ might contain an arbitrary component in addition to the positive electrode active material, for example, various additive components, such as binder and electrically conducting material, or the like. It is preferable that the positive electrode active material layer 22$a$ contains the binder and the electrically conducting material, in addition to the positive electrode active material. The binder is, typically, made of resin, and it is preferable to use a fluorine type resin, such as polyvinylidene fluoride (PVdF), even among the resins. As the electrically conducting material, it is preferable to use a carbon material, such as acetylene black (AB). In addition, the positive electrode active material layer 22$a$ density is preferably equal to or more than 3.0 g/cm$^3$, or further preferably equal to or more than 3.2 g/cm$^3$. In a case where the density of the positive electrode active material layer 22$a$ is high as described above, the positive electrode collecting body 22$c$ becomes to be easily broken, and thus it is suitable as the object to which the effect of the herein disclosed technique is applied.

The positive electrode protective layer 22$p$ is a layer whose electrical conduction property is configured to be lower than the positive electrode active material layer 22$a$. The positive electrode protective layer 22$p$ is, as shown in FIG. 5, provided in a strip-like shape along the longitudinal direction LD of the positive electrode collecting body 22$c$. The positive electrode protective layer 22$p$ is provided at a boundary portion between the positive electrode collecting body 22$c$ and the positive electrode active material layer 22$a$ in the wound axis direction WD. The positive electrode protective layer 22$p$ herein is provided at one of the end parts in the wound axis direction WD of the positive electrode collecting body 22$c$, in particular, an end part at a side where the positive electrode tab 22$t$ exists (top end part in FIG. 5). By including the positive electrode protective layer 22$p$, it is possible to inhibit the battery 100 from suffering an inside short circuit caused by direct contact of the positive electrode 22 with the negative electrode active material layer 24$a$ when the separator 70 is broken.

The positive electrode protective layer 22$p$ contains an inorganic filler having an insulating property. As one example of the inorganic filler, it is possible to use a ceramic particle, such as alumina. The positive electrode protective layer 22$p$ might contain an arbitrary component in addition to the inorganic filler, for example, various additive components, such as binder and electrically conducting material, or the like. The binder and the electrically conducting material might be the same as those which are illustrated to be able to be contained in the positive electrode active material layer 22$a$. However, the positive electrode protective layer 22$p$ is not essential, and might be omitted in another embodiment.

The negative electrode 24 is, as shown in FIG. 5, a member formed in a strip-like shape. The negative electrode 24 includes a negative electrode collecting body 24$c$ formed in a strip-like shape, and a negative electrode active material layer 24*a* fixed on at least one surface of the negative electrode collecting body 24*c*. It is preferable from a perspective of battery performance that the negative electrode active material layer 24*a* is formed on both surfaces of the negative electrode collecting body 24*c*.

As each of members configuring the negative electrode 24, it is possible to use a conventionally known material which can be used for a general battery (for example, lithium ion secondary battery), without particular restriction. For example, it is preferable that the negative electrode collecting body 24*c* is made from an electrically conductive metal, such as copper, copper alloy, nickel, and stainless steel, and the negative electrode collecting body herein is a metal foil, in particular, a copper foil. A thickness of the negative electrode collecting body 24*c* is preferably 5 μm to 20 μm, or further preferably 6 μm to 10 km.

The negative electrode 24 includes, as shown in FIG. 5, negative electrode tabs 24*t* that protrudes toward the outer side (upper side in FIG. 5) from one end side in the wound axis direction WD. Plural negative electrode tabs 24*t* are provided to be spaced away from each other by a predetermined interval (intermittently) along the longitudinal direction LD. With respect to the wound axis direction WD, the negative electrode tab 24*t* is provided on an end part at the same side as the positive electrode tab 22*t*. The negative electrode tab 24*t* herein is a part of the negative electrode 24. The negative electrode tab 24*t* herein is an area where the negative electrode active material layer 24*a* is not formed, and where the negative electrode collecting body 24*c* is exposed. However, a part of the negative electrode active material layer 24*a* might protrude to stick the negative electrode tab 24*t*. In addition, the negative electrode tab 24*t* might be a member different from the negative electrode 24.

The plural negative electrode tabs 24*t* each is herein in a trapezoidal shape. However, each shape and size of plural negative electrode tabs 24*t* can be suitably adjusted, similarly to the positive electrode tab 22*t*. In one aspect, a length in the width direction (LD direction in FIG. 5) of the negative electrode tab 24*t* might be 10 mm to 30 mm (for example, 15 mm to 20 mm), and a length in the protruding direction (Z direction in FIG. 5) of the negative electrode tab 24*t* might be 10 mm to 30 mm (for example, 15 mm to 20 mm). The plural negative electrode tabs 24*t* are laminated at one of the end parts (top end part in FIG. 5) in the wound axis direction WD of the negative electrode 24, so as to configure the negative electrode tab group 27 (see FIG. 2).

The negative electrode active material layer 24*a* is, as shown in FIG. 5, provided in a strip-like shape along the longitudinal direction LD of the negative electrode collecting body 24*c*. The width of the negative electrode active material layer 24*a* is larger than the width of the positive electrode active material layer 22*a*. Incidentally, the width of the negative electrode active material layer 24*a* means a length in the wound axis direction WD of a portion whose thickness is approximately constant, and it does not include a portion of the negative electrode tab 24*t* even in a case where, for example, a part of the negative electrode active material layer 24*a* protrudes to stick the negative electrode tab 24*t*. The negative electrode active material layer 24*a* contains a negative electrode active material that can reversibly store and release a charge carrier. It is preferable that the negative electrode active material is, for example, a carbon material, such as graphite, or a silicon material. When a total solid content of the negative electrode active material layer 24*a* is treated as 100 mass %, the negative electrode active material might occupy approximately 80 mass % or more, typically 90 mass % or more, or, for example, 95 mass % or more. The negative electrode active material layer 24*a* might contain an arbitrary component in addition to the negative electrode active material, for example, various additive components, such as binder and electrically conducting material, or the like. It is preferable that the negative electrode active material layer 24*a* contains the binder in addition to the negative electrode active material. It is preferable that the binder contains rubbers, such as styrene butadiene rubber (SBR), or celluloses, such as carboxymethyl cellulose (CMC). The negative electrode active material layer 24*a* might contain a carbon material as the electrically conducting material, if needed.

The separator 70 is, as shown in FIG. 5 and FIG. 7, a member formed in a strip-like shape. The separator 70 is an insulation sheet on which plural fine penetration holes are formed, and charge carriers can pass through the plural fine penetration holes. A width of the separator 70 is larger than the width of the negative electrode active material layer 24*a*. By arranging the separator 70 between the positive electrode 22 and the negative electrode 24, it is possible to not only inhibit the contact of the positive electrode 22 and the negative electrode 24, but also make the charge carrier (for example, lithium ion) move between the positive electrode 22 and the negative electrode 24. Although not particularly restricted, a thickness of the separator 70 (length in the laminate direction MD, and this meaning is similarly used, below) is preferably equal to or more than 3 μm, or further preferably equal to or more than 5 m. In addition, the thickness of the separator 70 is preferably equal to or less than 25 μm, further preferably equal to or less than 22 μm, or furthermore preferably equal to or less than 18 m.

Herein, two separators 70 are used for one wound electrode assembly 20. Regarding the separator 70, it is preferable that two separators are used for one wound electrode assembly 20 as shown in the present embodiment, in other words, it is preferable that the first separator 70A and the second separator 70B are included. Two separators might have configurations different from each other, or might have configurations similar to each other.

The separator 70 is a member establishing an insulation between the positive electrode active material layer 22*a* of the positive electrode 22 and the negative electrode active material layer 24*a* of the negative electrode 24. As the separator 70, it is suitable, for example, to use a porous resin sheet consisting of a polyolefin resin, such as polyethylene (PE) and polypropylene (PP). Incidentally, on a surface of the separator 70, a heat resistance layer (HRL) containing an inorganic filler might be provided. As the inorganic filler, for example, it is possible to use alumina, boehmite, water oxidation aluminum, titania, or the like. In addition, on the surface of the separator 70, no adhesion layer might be provided. As the adhesion layer, it is possible to use, for example, an organic resin type, an acrylic resin type, an epoxy resin type, a styrene butadiene rubber type, a silicone rubber type, a PVdF type, or the like.

Next, a wound aspect of the wound electrode assembly 20 in accordance with the present embodiment will be described. Here, FIG. 8 is a schematic view that shows a configuration of a cross section of the wound electrode assembly shown in FIG. 3. Incidentally, in FIG. 8, a hatching for each member is omitted for the sake of implementing easily viewable manner. As shown in FIG. 8, the wound electrode assembly 20 is a flat-shaped wound electrode assembly in which the positive electrode 22 formed in a strip-like shape and the negative electrode 24 formed in a strip-like shape are wound via the separator 70 formed in a strip-like shape (first separator 70A, and second separator 70B). On the positive electrode 22, plural positive electrode tabs 22*t* are provided. Additionally, in a cross section view cut in a direction orthogonal to the wound axis WL of the wound electrode assembly 20, the positive electrode 22 includes a first area A1, which is positioned at one side (lower side in FIG. 8) more than the wound axis WL of the wound electrode assembly 20 with respect to the thickness direction (direction X in FIG. 8) reaching from one flat surface 20$f_1$ through the wound axis WL to the other flat surface 20$f_2$, and includes a second area A2, which is positioned at the other side (upper side in FIG. 8) more than the wound axis WL in the thickness direction X. In the first area A1, the positive electrode tabs 22*t* are provided on eighty percent or more of layers of the positive electrode 22. Additionally, in the second area A2, plural layers on which the positive electrode tabs 22*t* are formed exist among 1st to 5th layers counted from the wound axis WL side. Then, on layers positioned at the outer side more than the 5th layer counted from the wound axis WL side, the positive electrode tab 22*t* is not provided. In addition, as shown in FIG. 4, plural positive electrode tabs 22*t* are laminated and then joined to the positive electrode collecting part 50. Incidentally, in FIG. 8, a reference sign 22*e* represents a winding-end end part of the positive electrode, a reference sign 24*e* represents a winding-end end part of the negative electrode, a reference sign 70As represents a winding-start end part of the first separator, a reference sign 70Ae represents a winding-end end part of the first separator, a reference sign 70Bs represents a winding-start end part of the second separator, and a reference sign 70Be represents a winding-end end part of the second separator, respectively.

Incidentally, regarding a counting manner for "layer" on the first area A1 of the positive electrode 22, the layers are counted as 1st layer, 2nd layer, . . . , and nth layer, from the wound axis WL side (inner side) toward the outermost surface side (outer side) of the wound electrode assembly 20 on the first area A1. Regarding a counting manner for "layer" on the second area A2 of the positive electrode 22, the layers are counted as 1st layer, 2nd layer, . . . , and nth layer from the wound axis WL side (inner side) toward the outermost surface side (outer side) of the wound electrode assembly 20 on the second area A2. In addition, regarding a counting manner for "layer" on the first area A1 of the negative electrode 24, the layers are counted as 1st layer, second layer, . . . , and nth layer from the wound axis WL side (inner side) toward the outermost surface side (outer side) of the wound electrode assembly 20 on the first area A1. Regarding a counting manner for "layer" on the second area A2 of the negative electrode 24, the layers are counted as 1st layer, 2nd layer, . . . , and nth layer from the wound axis WL side (inner side) toward the outermost surface side (outer side) of the wound electrode assembly 20 on the second area A2. However, at a winding-start end part vicinity of the electrode, when a length from the winding-start end part of the electrode to a first folding part (first turning part, apex of first bent part) is shorter than a predetermined length, it is not counted as 1 layer.

Figure 9:
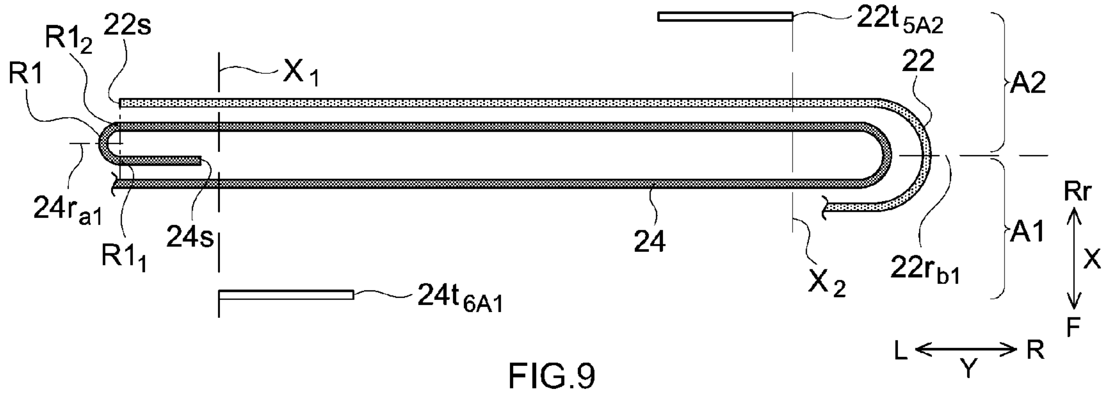
FIG. 9 is a schematic view that shows a vicinity of a winding-start end part of the positive electrode and a vicinity of a winding-start end part of the negative electrode in FIG. 8.

Here, FIG. 9 is a schematic view that shows a vicinity of a winding-start end part of a positive electrode 22*s* and a vicinity of a winding-start end part of a negative electrode 24*s*. Incidentally, in FIG. 9, a drawing of the separator 70 is omitted for the sake of implementing easily viewable manner. A straight line $X_1$ in FIG. 9 represents a straight line that passes through an end part at the first folding part 24$r_{a1}$ side of a negative electrode tab 24$t_{6A1}$ existing at a position being the closest to the first folding part 24$r_{a1}$ in the thickness direction X among the plural negative electrode tabs 24*t*, and that extends in the thickness direction X. In addition, a straight line $X_2$ represents a straight line that passes through an end part at the first folding part 22$r_{b1}$ side of a positive electrode tab 22$t_{5A2}$ existing at a position being the closest to the first folding part 22$r_{b1}$ in the thickness direction X among the plural positive electrode tabs 22*t*, and that extends in the thickness direction X. In the present embodiment, regarding the negative electrode 24, the winding-start end part 24*s* of the negative electrode in the thickness direction X does not exceed the straight line $X_1$ (in other words, a length from the first folding part 24$r_{a1}$ to the winding-start end part 24*s* of the negative electrode is shorter than a length from the first folding part 24$r_{a1}$ to the straight line $X_1$), and thus it is not counted as 1 layer. In addition, regarding the positive electrode 22, the winding-start end part 22*s* of the positive electrode exceeds the straight line $X_2$ in the thickness direction X (in other words, a length from the first folding part 22$r_{b1}$ to the winding-start end part 22*s* of the positive electrode is longer than a length from the first folding part 22$r_{b1}$ to the straight line $X_2$), and thus it is counted as 1 layer. In short, as shown in FIG. 8, regarding the negative electrode 24 on the first area A1, layers on which the negative electrode tabs 24$t_{1A1}$, 24$t_{2A1}$, 24$t_{3A1}$, 24$t_{4A1}$, 24$t_{5A1}$, and 24$t_{6A1}$ exist are respectively counted as the 1st layer, 2nd layer, 3rd layer, 4th layer, 5th layer, and 6th layer. Regarding the negative electrode 24 on the second area A2, layers on which the negative electrode tabs 24$t_{1A2}$, 24$t_{2A2}$, 24$t_{3A2}$, 24$t_{4A2}$, and 24$t_{5A2}$ exist are respectively counted as the 1st layer, 2nd layer, 3rd layer, 4th layer, and 5th layer. In addition, regarding the positive electrode 22 on the first area A1, layers on which the positive electrode tabs 22$t_{1A1}$, 22$t_{2A1}$, 22$t_{3A1}$, 22$t_{4A1}$, 22$t_{5A1}$, and 22$t_{6A1}$ exist are respectively counted as the 1st layer, 2nd layer, 3rd layer, 4th layer, 5th layer, and 6th layer. Regarding the positive electrode 22 on the second area A2, layers on which positive electrode tabs 22$t_{1A2}$, 22$t_{2A2}$, 22$t_{3A2}$, 22$t_{4A2}$, and 22$t_{5A2}$ exist are respectively counted as the 1st layer, 2nd layer, 3rd layer, 4th layer, and 5th layer.

Figure 10:
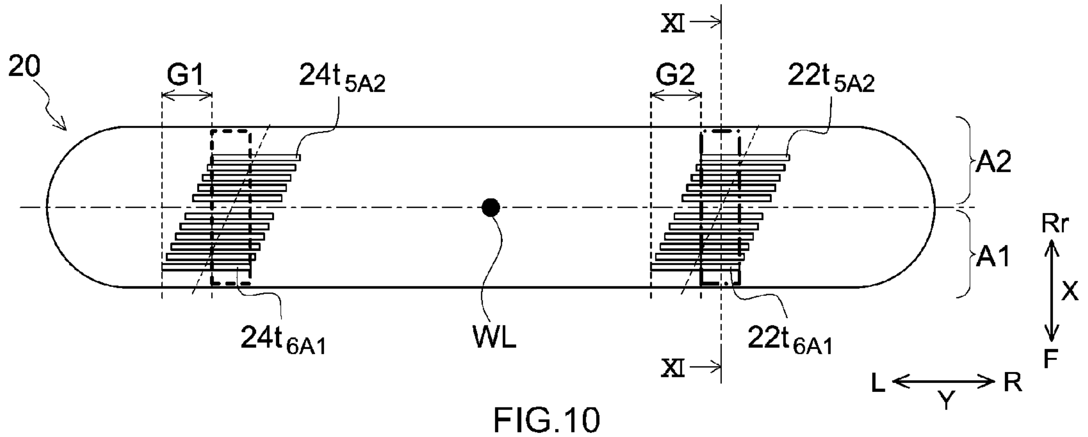
FIG. 10 is an explanation view that is for explaining a first area and a second area in FIG. 8.
Figure 11:
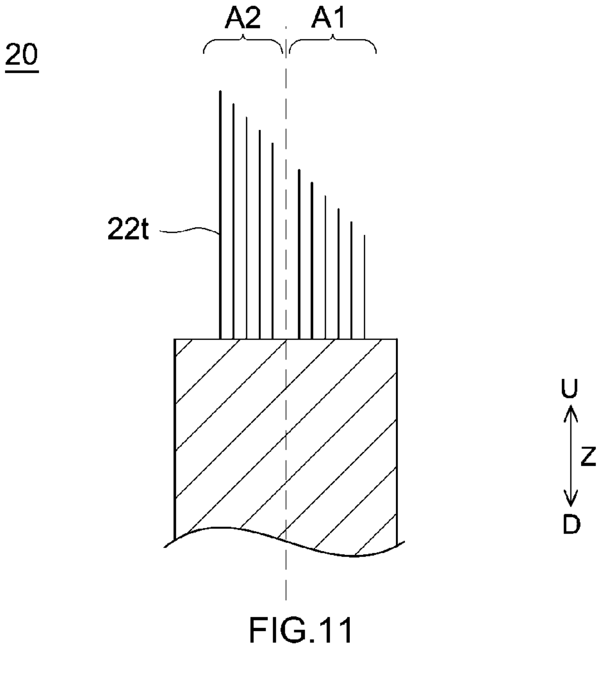
FIG. 11 is a longitudinal cross section view that is schematically shown along a XI-XI line in FIG. 10.
Figure 13:
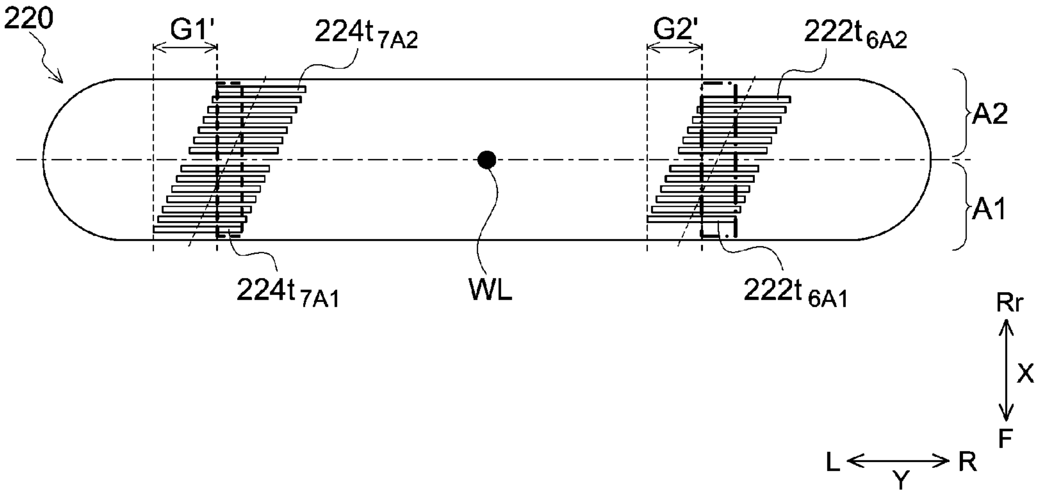
FIG. 13 is a FIG. 10 corresponding diagram of a conventional technique.

FIG. 10 is an explanation view that is for explaining the first area A1 and the second area A2 in FIG. 8. In addition, FIG. 13 is a FIG. 10 corresponding diagram of a conventional technique. As shown in FIG. 10 and FIG. 13, it can be understood that a maximum tab shift amount G2 (here, tab shift amount in a Y direction of the positive electrode tab 22$t_{6A1}$ and the positive electrode tab 22$t_{5A2}$) in a width direction (Y direction in FIG. 10) of the positive electrode tab group 25 of the wound electrode assembly 20 is decreased in comparison to a maximum tab shift amount G2' (here, tab shift amount in the Y direction of the positive electrode tab 222$t_{6A1}$ and the positive electrode tab 222$t_{6A2}$) in the width direction (Y direction in FIG. 13) of the positive electrode tab group 225 of the wound electrode assembly 220. In other words, it can be understood that a joining portion (broken line frame portion in FIG. 10) with the positive electrode tab group 25 and the positive electrode collecting part 50 of the wound electrode assembly 20 is increased in comparison to a joining portion (broken line frame portion in FIG. 13) with the positive electrode tab group 225 and the positive electrode collecting part 50 of the wound electrode assembly 220. In addition, regarding the negative electrode 24 side, it can be similarly understood that a maximum tab shift amount G1 (here, tab shift amount in the Y direction of the negative electrode tab 24$t_{6A1}$ and the negative electrode tab 24$t_{5A2}$) in the width direction (Y direction in FIG. 10) of the negative electrode tab group 27 of the wound electrode assembly 20 is decreased in comparison to a maximum tab shift amount G1' (here, tab shift amount in the Y direction of the negative electrode tab 224$t_{7A1}$ and the negative electrode tab 224$t_{7A2}$) in the width direction (Y direction in FIG. 13) of the negative electrode tab group 227 of the wound electrode assembly 220. In other words, it can be understood that a joining portion (dashed line frame portion in FIG. 10) with the negative electrode tab group 27 and the negative electrode collecting part 60 of the wound electrode assembly 20 is increased in comparison to a joining portion (dashed line frame portion in FIG. 13) with the negative electrode tab group 227 and the negative electrode collecting part 60 of the wound electrode assembly 220. Therefore, in the herein disclosed battery 100, the positive electrode tab group 25 (negative electrode tab group 27) and the positive electrode collecting part 50 (negative electrode collecting part 60) are stably joined in comparison to conventional one, and thus it is possible to say that the battery 100 is a battery whose reliability is suitably enhanced. Furthermore, in the herein disclosed battery 100, by suitably adjusting the number of the electrode tabs (positive electrode tab 22*t*, and negative electrode tab 24*t*) on the first area A1 and the second area A2, it is possible to suitably inhibit a battery resistance from being increased.

As shown in FIG. 8, a laminate number (layer number) of the positive electrode 22 of the wound electrode assembly 20 herein is configured to be 12, but the present disclosure is not restricted to this example. The laminate number of the positive electrode 22 of the wound electrode assembly 20 might be configured to be, for example, equal to or more than 10, preferably equal to or more than 20 from a perspective of making the battery 100 have a higher capacity, further preferably equal to or more than 30, or, for example, equal to or more than 40. In addition, as shown in FIG. 8, a laminate number (layer number) of the negative electrode 24 of the wound electrode assembly 20 herein is configured to be 14, but the present disclosure is not restricted to this example. The laminate number of the negative electrode 24 of the wound electrode assembly 20 might be configured to be, for example, equal to or more than 10, preferably equal to or more than 20 from a perspective of making the battery 100 have a higher capacity, further preferably equal to or more than 30, or, for example, equal to or more than 40. Incidentally, in the wound electrode assembly 20, the laminate number of the positive electrode 22 and the laminate number of the negative electrode 24 might be the same or might be different from each other.

As described above, on the first area A1 herein, the positive electrode tabs 22*t* are provided at layers equal to or more than eighty percent of the positive electrode 22. In other words, a value of (layer number of the positive electrode 22 on which the positive electrode tab 22*t* is formed)/(total layer number of the positive electrode 22) is equal to or more than 0.8. In accordance with such a configuration, it is possible to suitably suppress a resistance increase of the battery 100. Here, the value of (layer number of the positive electrode 22 on which the positive electrode tab 22*t* is formed)/(total layer number of the positive electrode 22) is preferably equal to or more than 0.9 from a perspective of making the above described effect be easily obtained, or is further preferably 1. Incidentally, as shown in FIG. 8, regarding the present embodiment, within the first area A1, the positive electrode tabs 22*t* are provided on all of 6 layers of the positive electrode 22 having 6 layers. I other words, the value of (layer number of the positive electrode 22 on which the positive electrode tab 22*t* is formed)/(total layer number of the positive electrode 22) is 1. In addition, on the first area A1 herein, the negative electrode tabs 24*t* are provided at layers equal to or more than eighty percent of the negative electrode 24. In other words, a value of (layer number of the negative electrode 24 on which the negative electrode tab 24*t* is formed)/(total layer number of the negative electrode 24) is equal to or more than 0.8. In accordance with such a configuration, it is possible to suitably suppress a resistance increase of the battery 100. Here, the value of (layer number of the negative electrode 24 on which the negative electrode tab 24*t* is formed)/(total layer number of the negative electrode 24) is preferably equal to or more than 0.9 from a perspective of making the above described effect be easily obtained, and further preferably 1. Incidentally, as shown in FIG. 8, regarding the present embodiment, on the first area A1, the negative electrode tabs 24*t* are provided at 6 layers among 7 layers of the negative electrode 24. In other words, the value of (layer number of the negative electrode 24 on which the negative electrode tab 24*t* is formed)/(total layer number of the negative electrode 24) is 0.9. The value of (layer number of the positive electrode 22 on which the positive electrode tab 22*t* is formed)/(total layer number of the positive electrode 22) and the value of (layer number of the negative electrode 24 on which the negative electrode tab 24*t* is formed)/(total layer number of the negative electrode 24) might be the same, or might be different from each other.

As described above, on the second area A2 herein, at layers counted until 5th layer from the wound axis WL side, there are plural layers on which the positive electrode tabs 22*t* are formed. Here, at all layers among 5 layers from the wound axis WL side, the positive electrode tabs 22*t* are formed. Then, on layers at outer side more than 5th layer counted from the wound axis WL side, the positive electrode tab 22*t* is not provided. In accordance with such a configuration, it is possible to stably join the positive electrode tab group 25 and the positive electrode collecting part 50. Here, from a perspective of making the above described effect be easily obtained, it is preferable not to provide the positive electrode tab 22*t* on layers at the outer side more than 4th layer counted from the wound axis WL side, or it is further preferable not to provide the positive electrode tab 22*t* on layers at the outer side more than 2nd layer counted from the wound axis WL side. On the second area A2, any one layer of 1st layer to 5th layer might be provided with no positive electrode tab 22*t*. In addition, it is preferable that at least one among 1st layer and 2nd layer is provided with the positive electrode tab 22*t*. Then, it is preferable that the positive electrode tabs 22*t* are formed on 1st layer to 3rd layer. Particularly, in a case where a length of 1st layer of the positive electrode 22 in the wound direction D1 of the positive electrode 22 is equal to or more than 5 cm, it is preferable that the positive electrode tab 22*t* is provided additionally on 1st layer of the positive electrode 22.

In addition, regarding the present embodiment, on the second area A2, at layers counted until 5th layer from the wound axis WL side, there are plural layers on which the negative electrode tabs 24*t* are formed. Here, at all layers among 5 layers from the wound axis WL side, the negative electrode tabs 24*t* are formed. Then, on layers at outer side more than 5th layer counted from the wound axis WL side, the negative electrode tab 24*t* is not provided. In accordance with such a configuration, it is possible to stably join the negative electrode tab group 27 and the negative electrode collecting part 60. Here, from a perspective of making the above described effect be easily obtained, it is preferable not to provide the negative electrode tab 24*t* on layers at the outer side more than 4th layer counted from the wound axis WL side, or it is further preferable not to provide the negative electrode tab 24*t* on layers at the outer side more than 2nd layer counted from the wound axis WL side. On the second area A2, any one layer of 1st layer to 5th layer might be provided with no negative electrode tab 24*t*. In addition, it is preferable that at least one among 1st layer and 2nd layer is provided with the negative electrode tab 24*t*. Then, it is preferable that the negative electrode tabs 24*t* are formed on 1st layer to 3rd layer. Particularly, in a case where a length of 1st layer of the negative electrode 24 in the wound direction D1 of the negative electrode 24 is equal to or more than 5 cm, it is preferable that the negative electrode 24 is provided additionally on 1st layer of the negative electrode 24.

The maximum tab shift amount G2 in the width direction of the positive electrode tab group 25, which is not particularly restricted if the effects of the herein disclosed technique is implemented, is, for example, equal to or more than 0.01 mm, or from a perspective of facilitating confirmation whether there is a broken positive electrode tab 22*t* or not, is preferably equal to or more than 0.05 mm, or further preferably equal to or more than 0.1 mm. In addition, the upper limit of the maximum tab shift amount G2 is, for example, equal to or less than 10 mm, preferably equal to or less than 5 mm from a perspective of stably joining the positive electrode tab group 25 and the positive electrode collecting part 50, or further preferably equal to or less than 2 mm. The maximum tab shift amount G1 in the width direction of the negative electrode tab group 25, which is not particularly restricted if the effects of the herein disclosed technique is implemented, is, for example, equal to or more than 0.01 mm, or from the perspective of facilitating confirmation whether there is a broken negative electrode tab 24*t* or not, is preferably equal to or more than 0.05 mm, or further preferably equal to or more than 0.1 mm. In addition, the upper limit of the maximum tab shift amount G1 is, for example, equal to or less than 10 mm, preferably equal to or less than 5 mm from a perspective of stably joining the negative electrode tab group 27 and the negative electrode collecting part 60, or further preferably equal to or less than 2 mm. However, it is not intended that the present disclosure is restricted to these examples. Incidentally, the maximum tab shift amounts G1 and G2 might be the same, or might be different from each other.

As shown in FIG. 9, regarding the present embodiment, the first area A1 includes the winding-start end part 24*s* of the negative electrode. Additionally, in a range from the winding-start end part 24*s* of the negative electrode to an initial first R part R1 (in other words, to an end part $R1_1$ of the initial first R part), the winding-start end part 22*s* of the positive electrode starting from the second area A2 is arranged. In accordance with such a configuration, it is facilitated to make the surface pressure inside the wound electrode assembly 20 be constant, and thus it is possible to suitably enhance a precipitation resistant property of Li (lithium). Here, a length from the winding-start end part 24*s* of the negative electrode to the end part $R1_1$ of the first R part on the first area A1 is preferably 1 mm to 10 mm, or further preferably 4.5 mm to 7.5 mm. In addition, the winding-start end part 22*s* of the positive electrode on the second area A2 is arranged away from the end part $R1_2$ of the first R part R1 preferably by 0.1 mm to 10 mm, or further preferably by 1.5 mm to 4.5 mm. However, it is not intended that the present disclosure is restricted to these examples.

As shown in FIG. 8, regarding the present embodiment, a winding-end tape 200 is arranged at the winding-end end part of the separator (here, winding-end end part 70Ae of the first separator). Incidentally, as the winding-end tape 200, it is possible to use a winding-end tape used for this type of battery (for example, a winding-end tape made from resin), without particular restriction. By imparting the winding-end tape 200 as described above, it is possible to suitably fix the winding-end end part of the separator onto the outermost surface of the wound electrode assembly 20, and thus it is preferable.

<Manufacturing Method for Battery>

Next, an example of a manufacturing method for the battery 100 will be described. Regarding a manufacture for the wound electrode assembly 20, at first, the first separator 70A, the positive electrode 22, the second separator 70B, and the negative electrode 24 are prepared. Then, a winding roller is used to wind each of members. After that, by pressing a wound body with a predetermined pressure and by imparting the winding-end tape 200 onto the winding-end end part 70Ae of the first separator, it is possible to obtain the wound electrode assembly 20. Two of wound electrode assemblies 20 described above are prepared, these are inserted into the outer package 12 in a state of being joined to the electrode collecting member on which an electrode tab group is attached to the sealing plate 14, and then the outer package 12 and the sealing plate 14 are joined (welded), so as to construct the battery case 10. Then, the electrolyte is injected from the liquid injection hole 15 of the sealing plate 14 to an inside of the battery case 10, and then the liquid injection hole 15 is covered with the sealing member 16. As described above, it is possible to manufacture the battery 100.

Although the battery 100 can be used for various purposes, it can be suitably used, for example, as a power source for motor (power supply for driving) mounted on a vehicle, such as passenger car and truck, on a ship, or on a heavy machine. Although a type of the vehicle is not particularly restricted, it is possible to be used, for example, on a plug-in hybrid vehicle (PHEV; Plug-in Hybrid Electric Vehicle), a hybrid vehicle (HEV; Hybrid Electric Vehicle), an electric vehicle (BEV; Battery Electric Vehicle), or the like.

Above, some embodiments of the present disclosure are explained, but the above described embodiments are merely examples. The present disclosure can be implemented in various other forms. The present disclosure can be executed based on the contents disclosed in the present specification, and the technical common sense in the present field. The technique recited in the appended claims includes variously deformed or changed versions of the embodiments that have been illustrated above. For example, one part of the above described embodiment can be replaced with another deformed aspect, and furthermore another deformed aspect can be added to the above described embodiment. In addition, unless a technical feature is explained to be essential, this technical feature can be appropriately deleted.

Figure 12:
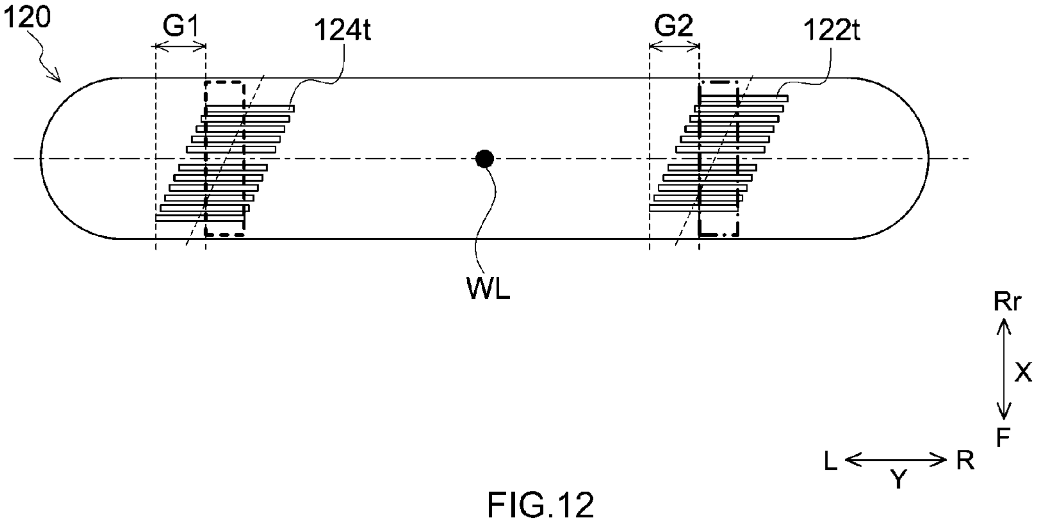
FIG. 12 is a FIG. 10 corresponding diagram in accordance with another embodiment.

For example, in the above described embodiment, the first area A1 on which the positive electrode tab 22*t* is formed and the first area A1 on which the negative electrode tab 24*t* is formed are positioned at the same side, the second area A2 on which the positive electrode tab 22*t* is formed and the second area A2 on which the negative electrode tab 24*t* is formed are positioned at the same side, but the present disclosure is not restricted to this example. Here, FIG. 12 is a FIG. 8 corresponding diagram in accordance with another embodiment. As shown in FIG. 12, in another embodiment, the first area on which the positive electrode tab 22*t* is formed and the second area on which the negative electrode tab 24*t* is formed might be positioned at the same side, and the second area on which the positive electrode tab 22*t* is formed and the first area on which the negative electrode tab 24*t* is formed might be positioned at the same side.

For example, in the embodiment, an area including the winding-start end part 24*s* of the negative electrode (in other words, an area from the winding-start end part 24*s* of the negative electrode to the first folding part $\mathbf{24}r_{a1}$) is positioned at the first area A1 side, but the present disclosure is not restricted to this example. In another embodiment, the area including the winding-start end part 24*s* of the negative electrode might be positioned at the second area A2 side.

For example, in the above described embodiment, with respect to the wound axis direction WD, the positive electrode tab 22*t* and the negative electrode tab 24*t* are provided on the end parts at the same side, but the present disclosure is not restricted to this example. The herein disclosed technique can be applied to a battery including a wound electrode assembly in which the positive electrode tab and the negative electrode tab are provided on the end parts at the different sides from each other with respect to the wound axis direction WD.

For example, in the above described embodiment, the notch exists on the first tab of the positive electrode 22 and the negative electrode 24, but the battery disclosed herein might include no notch described above.

For example, in the embodiment, the winding-end tape is imparted on the winding-end end part of the separator positioned at the outermost surface of the wound electrode assembly, but the present disclosure is not restricted to this example. The herein disclosed technique can be applied to a battery on which the winding-end tape is not imparted. In that case, it is preferable that the adhesion layer is formed on an inner side surface at the winding-end end part vicinity of the separator positioned on the outermost surface of the wound electrode assembly. By doing this, it is possible to suitably fix the winding-end end part of the separator onto the wound electrode assembly.

As described above, regarding particular aspects of the herein disclosed technique, it is possible to recite each of items described below.

Item 1: A battery comprising a wound electrode assembly formed in a flat shape in which a first electrode formed in a strip-like shape and a second electrode formed in a strip-like shape are wound via a separator formed in a strip-like shape, wherein the first electrode is provided with plural first electrode tabs, on a cross section view being cut in a direction orthogonal to a wound axis of the wound electrode assembly, the first electrode comprises a first area positioned at one side more than the wound axis of the wound electrode assembly with respect to a thickness direction reaching from one flat surface through the wound axis to the other flat surface, and comprises a second area positioned at the other side more than the wound axis with respect to the thickness direction, in the first area, the first electrode tabs are provided on layers of eighty percent or more of the first electrode, in the second area, among the layers counted until 5th layer from the wound axis side, there are plural layers on which the first electrode tabs are formed, on the layers positioned at an outer side more than the 5th layer counted from the wound axis side, none of the first electrode tabs are provided, and plural first electrode tabs are laminated and then joined to an electrically collecting member.

Item 2: The battery described in item 1, wherein the laminated first electrode tabs have a maximum tab shift amount that is 0.05 mm to 5 mm in a width direction of the first electrode tabs.

Item 3: The battery described in item 1 or item 2, wherein the first area comprises a winding-start end part of the second electrode, and in a range from the winding-start end part of the second electrode to a first R part, a winding-start end part of the first electrode starting from the second area is arranged.

Item 4: The battery described in any one of item 1 to item 3, wherein the first electrode is a positive electrode, and the first electrode tabs are positive electrode tabs.

Item 5: The battery described in any one of item 1 to item 4, wherein the laminated plural first electrode tabs are joined to the electrically collecting member in a state of being bent.

Item 6: The battery described in any one of item 1 to item 5, further comprising a battery case that is configured to accommodate the wound electrode assembly, wherein the battery case comprises an outer package having a bottom wall, a pair of first side walls, a pair of second side walls, and an opening, and comprises a sealing plate configured to seal the opening, and the wound electrode assembly is arranged inside the battery case to make the wound axis of the wound electrode assembly be arranged in a direction perpendicular to the bottom wall.

Item 7: The battery described in any one of item 1 to item 6, wherein a length in a direction orthogonal to the thickness direction of the wound electrode assembly with respect to a length along a wound axis direction of the wound electrode assembly is 3 times or more.

Item 8: The battery described in any one of item 1 to item 7, wherein a thickness of the wound electrode assembly is equal to or more than 10 mm.

Item 9: The battery described in any one of item 1 to item 8, wherein a notch is formed on a first tab of each of the first electrode and the second electrode.

What is claimed is:

1. A battery comprising:

a wound electrode assembly formed in a flat shape in which a first electrode formed in a strip-like shape and a second electrode formed in a strip-like shape are wound via a separator formed in a strip-like shape, wherein the first electrode is provided with plural first electrode tabs, on a cross section view being cut in a direction orthogonal to a wound axis of the wound electrode assembly, the first electrode comprises a first area positioned at one side more than the wound axis of the wound electrode assembly with respect to a thickness direction reaching from one flat surface through the wound axis to the other flat surface, and comprises a second area positioned at the other side more than the wound axis with respect to the thickness direction, in the first area, the first electrode tabs are provided on layers of eighty percent or more of the first electrode, in the second area, among the layers counted until 5th layer from the wound axis side, there are plural layers on which the first electrode tabs are formed, on the layers positioned at an outer side more than the 5th layer counted from the wound axis side, none of the first electrode tabs are provided, and plural first electrode tabs are laminated and then joined to an electrically collecting member.

2. The battery according to claim 1, wherein the laminated first electrode tabs have a maximum tab shift amount that is 0.05 mm to 5 mm in a width direction of the first electrode tabs.

3. The battery according to claim 2, wherein the second electrode is provided with plural second electrode tabs, and the plural second electrode tabs are laminated and have a maximum tab shift amount that is 0.01 mm to 10 mm in a width direction of the second electrode tabs.

4. The battery according to claim 1, wherein
the first area comprises a winding-start end part of the second electrode, and
in a range from the winding-start end part of the second electrode to a first R part, a winding-start end part of the first electrode starting from the second area is arranged.

5. The battery according to claim 1, wherein
the first electrode is a positive electrode, and the first electrode tabs are positive electrode tabs.

6. The battery according to claim 1, wherein
the laminated plural first electrode tabs are joined to the electrically collecting member in a state of being bent.

7. The battery according to claim 1, further comprising
a battery case (10) that is configured to accommodate the wound electrode assembly, wherein
the battery case comprises an outer package having a bottom wall, a pair of first side walls, a pair of second side walls, and an opening, and comprises a sealing plate configured to seal the opening, and
the wound electrode assembly is arranged inside the battery case to make the wound axis of the wound electrode assembly be arranged in a direction perpendicular to the bottom wall.

8. The battery according to claim 1, wherein
a length in a direction orthogonal to the thickness direction of the wound electrode assembly with respect to a length along a wound axis direction of the wound electrode assembly is 3 times or more.

9. The battery according to claim 1, wherein
a thickness of the wound electrode assembly is equal to or more than 10 mm.

10. The battery according to claim 1, wherein
a notch is formed on a first tab of each of the first electrode and the second electrode.

11. The battery according to claim 1, wherein a layer number of the first electrode of the wound electrode assembly is equal to or more than 20.

12. The battery according to claim 1, wherein the second electrode is provided with plural second electrode tabs, and the plural second electrode tabs are laminated and have a maximum tab shift amount that is 0.01 mm to 10 mm in a width direction of the second electrode tabs.

* * * * *